Dec. 3, 1957

W. HERSCOVITCH 2,815,049

TWO WHEEL MOBILE POWER SAWS WITH
ELEVATING WHEEL ATTACHMENT

Filed May 8, 1953

Inventor
William Herscovitch

By Watson Cole
Grindle + Watson
Attorneys

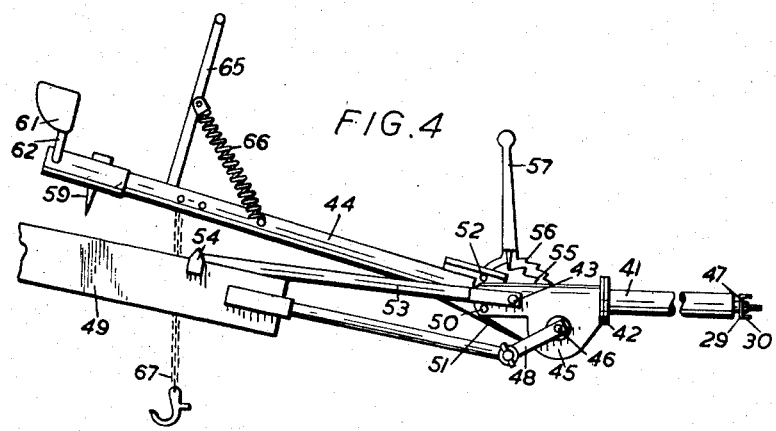
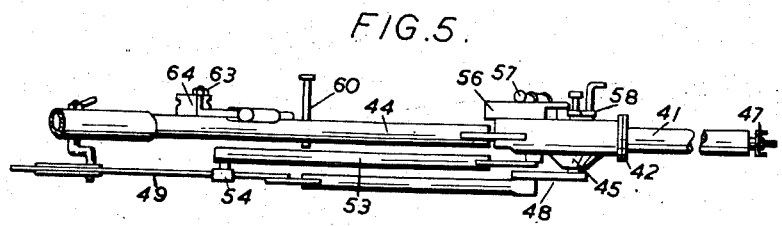
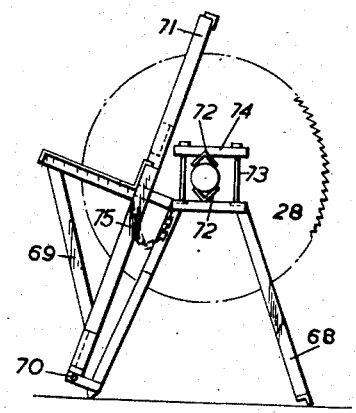

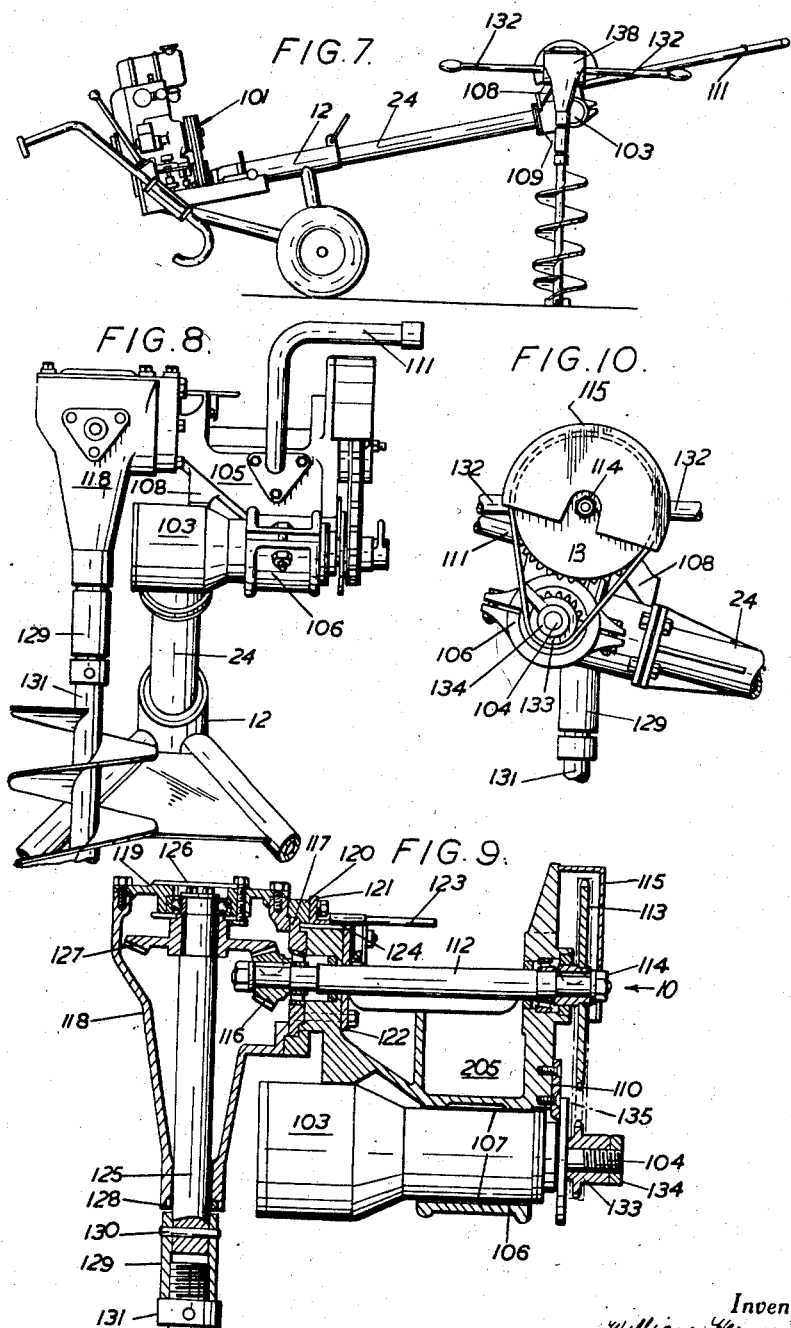

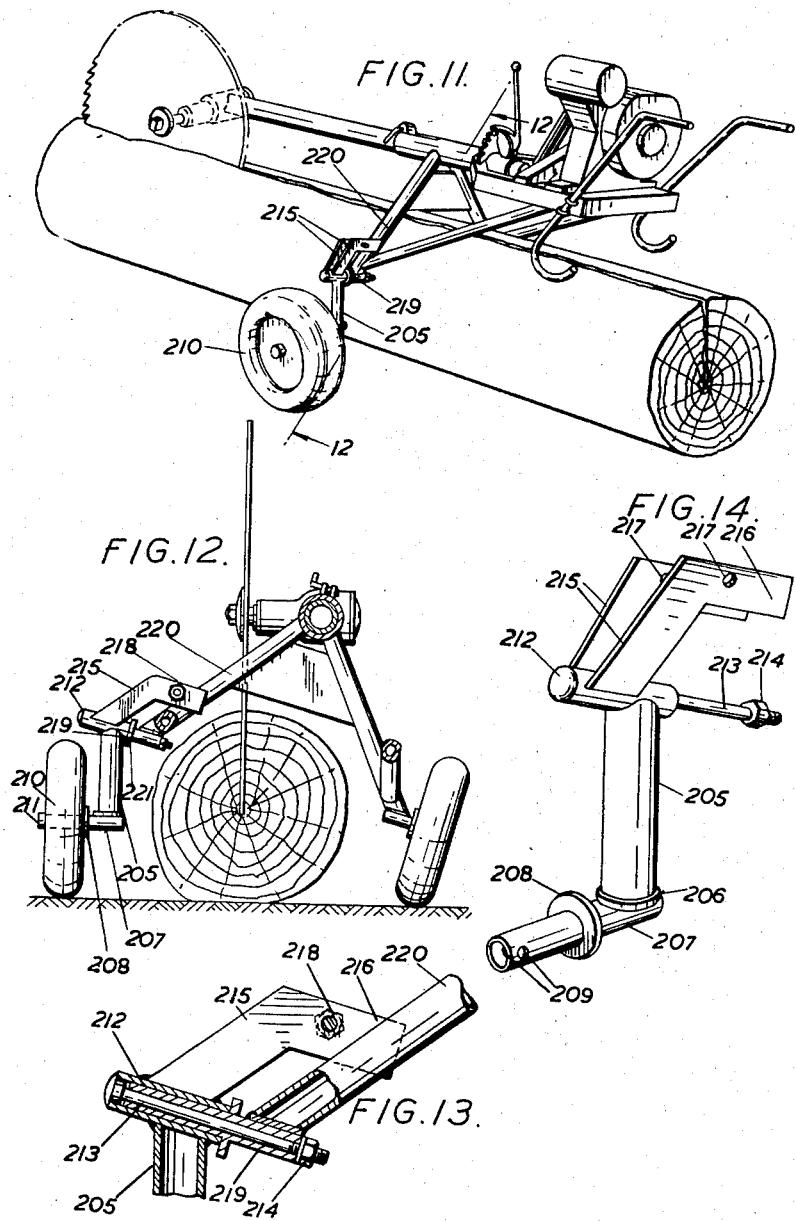

Dec. 3, 1957 W. HERSCOVITCH 2,815,049
TWO WHEEL MOBILE POWER SAWS WITH
ELEVATING WHEEL ATTACHMENT
Filed May 8, 1953 6 Sheets-Sheet 5
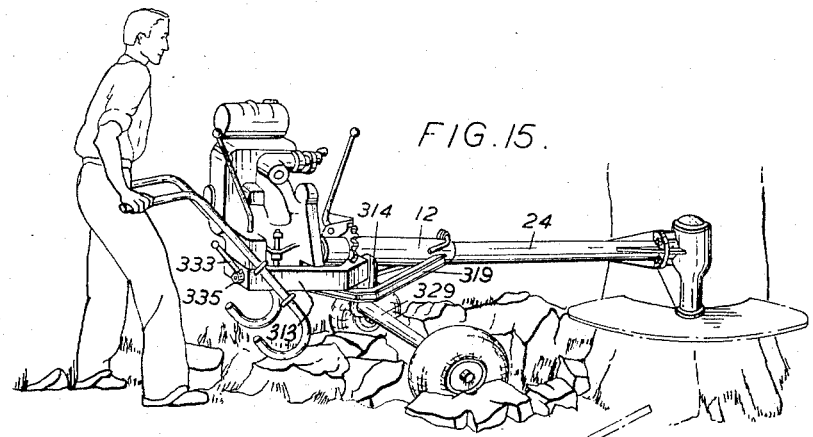
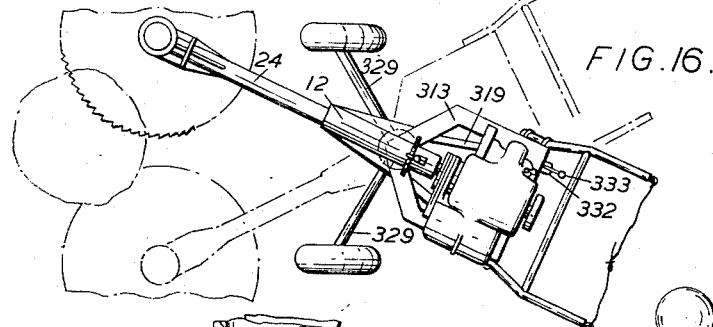
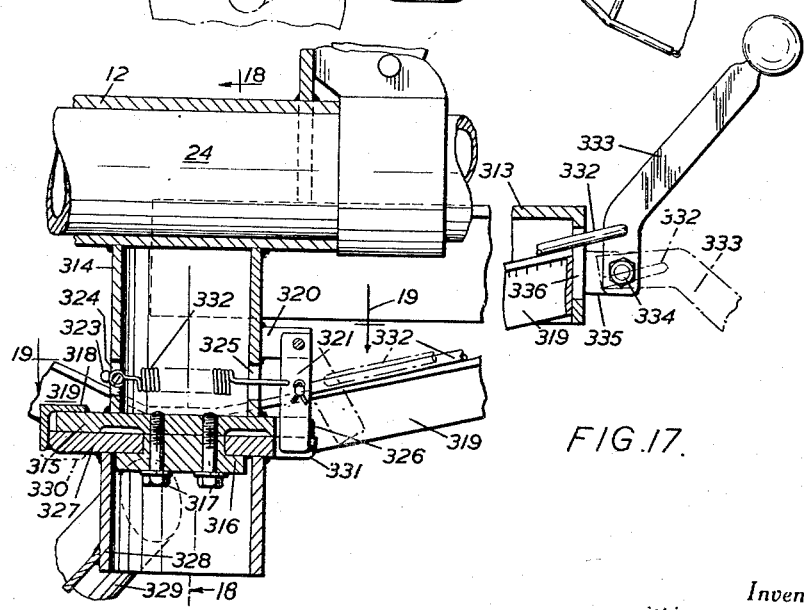
Inventor
William Herscovitch
By Watson, Cole
Grindle & Watson
Attorneys Dec. 3, 1957 W. HERSCOVITCH 2,815,049
TWO WHEEL MOBILE POWER SAWS WITH
ELEVATING WHEEL ATTACHMENT
Filed May 8, 1953 6 Sheets-Sheet 6
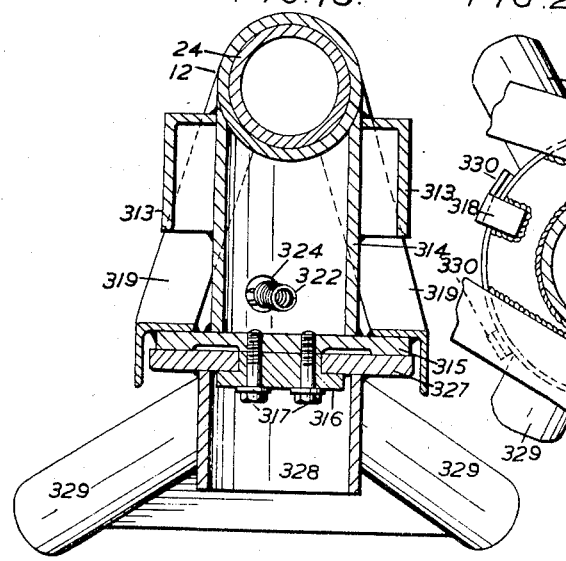
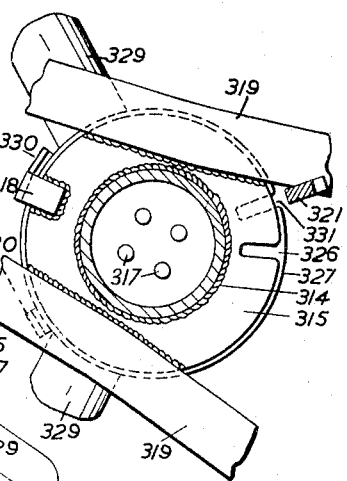
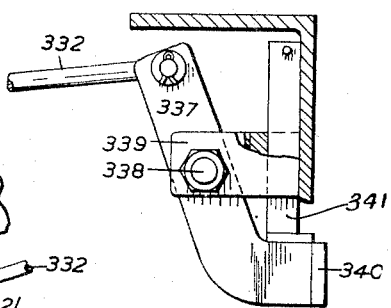
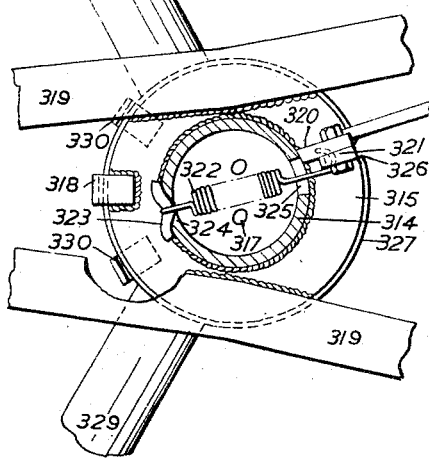
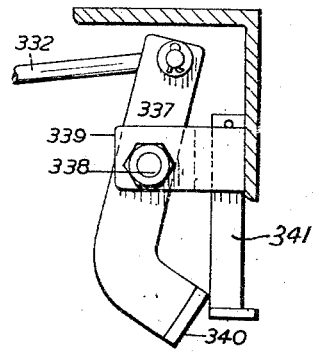
Inventor
William Herscovitch
By Watson, Cole,
Grindle & Watson
Attorneys

United States Patent Office

2,815,049
Patented Dec. 3, 1957

2,815,049

TWO WHEEL MOBILE POWER SAWS WITH ELEVATING WHEEL ATTACHMENT

William Herscovitch, Victoria, Australia

Application May 8, 1953, Serial No. 353,858

5 Claims. (Cl. 143—43)

This invention relates to improvements in mobile power saws.

As is well known it has previously been the practice to provide mobile power driven circular saws, mobile power driven drag saws, and saw benches so constructed as to be usable for cutting lengths of wood either longitudinally or transversely. These saws are used for felling timber, cutting the felled tree into lengths and trimming the branches therefrom and for cutting the sawn lengths into shorter billets of timber. As a result of the constructions as hitherto used it has been necessary to purchase and use a considerable amount of relatively costly equipment in order to effectively perform all the sawing operations customarily required to be done by a timber-feller in cutting firewood, for example.

A principal object of this invention is to provide a construction of machine frame which may have incorporated with it either a circular saw or a drag saw. Another object is to devise a mobile power saw so designed that the saw blade and part of the transmission or drives thereto may be readily detached and replaced by the equivalent members of a different type of saw, as to convert a mobile power driven circular saw to a mobile power driven drag saw. A further object is to provide means whereby a power driven circular saw may be so mounted as to constitute part of a stationary saw bench. Yet a further object is to devise an attachment for digging post holes, for boring rocks and for similar operations, and adapted to be readily fitted to the driving shaft of a mobile power driven circular saw. A still further object is to devise an attachment for fitment to a mobile power driven circular saw so that the unit may be used for ripping longitudinally logs of relatively large diameter. Yet another object of this invention is to provide a construction of mobile power driven circular saw whereby the frame which supports or carries the circular saw blade may be moved pivotally, relative to the wheels, in a horizontal or near horizontal plane.

The above and other objects of my invention will become apparent from the following description with reference to the accompanying drawings in which like reference numerals designate like parts and in which:

Figures 4 and 5 illustrate the design and construction of a drag saw attachment which may be substituted, in the main frame of the machine, for the circular saw as shown in Figures 1 and 2;

Figure 6 shows, in end elevation, a saw bench for use with the power driven circular saw;

Figure 7 is a side elevation of a post hole digging or like attachment fitted to a mobile power unit;

Figure 8 shows the apparatus in front elevation, on enlarged scale;

Figure 9 is a transverse cross-section through the attachment, on further enlarged scale, showing clearly the drives to the auger;

Figure 10 is a side elevation of the attachment, without the auger, in the direction of the arrow 1 of Figure 9;

Figure 11 is a perspective illustration of a mobile circular saw unit, incorporating a wheel mounting, being used for ripping a log longitudinally;

Figure 12 shows portions of the saw frame, incorporating the wheel mounting, in transverse cross-section, the section being taken on the line and in the direction of the arrows 12—12 of Figure 11;

Figure 13 is a vertical section through the wheel mounting and portion of the supporting leg to which it is fitted;

Figure 14 is a perspective view of the wheel mounting;

Figure 15 is a perspective view of a mobile power-operated circular saw having a pivotally mounted saw blade frame, the saw being shown as used to fell a tree;

Figure 16 shows, in plan view, the manner in which the saw blade-carrying frame can be moved pivotally relative to the transport wheels;

Figure 17 is a longitudinal cross-section, on enlarged scale relative to the scale of Figures 15 and 16, through the swivel mounting for the saw-carrying frame and showing also the catch devices for holding the saw-carrying frame fixed relative to the wheels and the release mechanism therefor;

Figure 18 is a transverse vertical cross-section through the swivel mounting taken on the line and in the direction indicated by the arrows 18—18 in Figure 17;

Figure 19 shows a horizontal cross-section through the swivel mounting taken on the line and in the direction indicated by the arrows 19—19 in Figure 17;

Figure 20 is a view similar to Figure 19 but showing the saw-carrying frame turned relative to the supporting legs whereon are mounted the transport wheels, the spring catch devices being omitted for clarity of illustration, and Figures 21 and 22 depict an alternative construction of catch-release mechanism.

Figure 1:
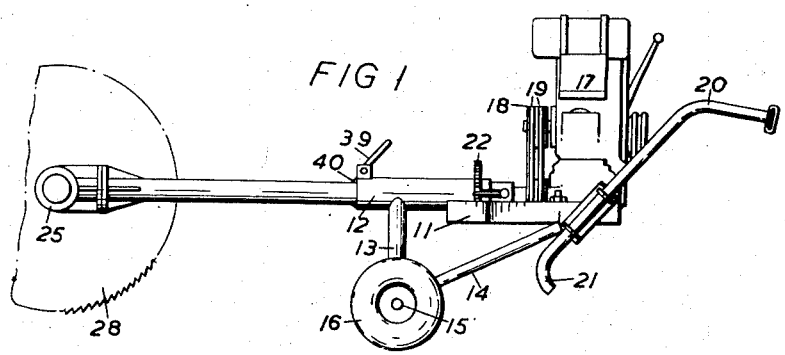
Figure 1 is a side elevation of a mobile power saw when incorporating a circular saw blade.
Figure 2:
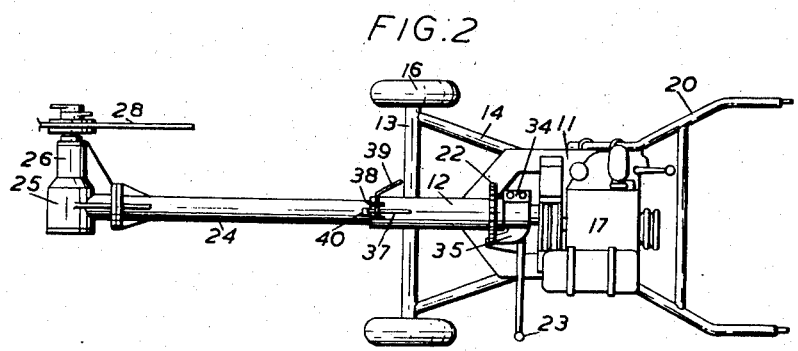
Figure 2 shows a plan view of the machine depicted in Figure 1.
Figure 3:
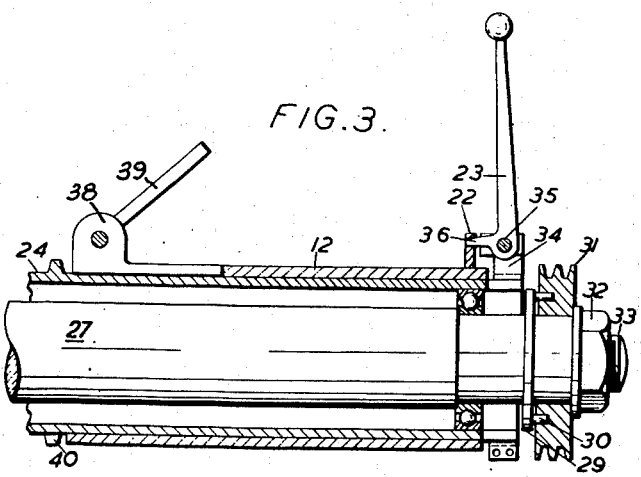
Figure 3 is a cross-sectional view, on enlarged scale, showing the manner of interchangeably mounting the saw sub-frame and the main frame.

Referring initially to Figures 1, 2 and 3 the mobile power driven saw illustrated therein has a main frame comprising a platform 11 having rigidly fastened to it a cylindrical tubular member or housing 12. Secured to the housing 12 are two legs 13 which are so arranged that they extend downwardly and outwardly and these legs are braced by members 14 fastened to the platform 11. A stub axle 15 is mounted at the lower end of each of the legs 13 and transport wheels 16 are rotatably mounted on those axles. At the rear of the platform 11 there is a pivotally mounted sub-frame supporting the power unit 17 in such manner that the power unit and the pulley wheel 18 on its power output shaft may be raised or lowered so as to tension or slacken the driving belts 19. Handles 20 are mounted at the rear of the main frame so as to enable the machine to be moved conveniently from place to place. These handles have downward extensions 21 which act as supports so that the rear portion of the machine may be supported thereon, when the saw blade will be held clear of the ground.

Near the rear end of the housing 12 there is fastened a substantially segmental indexing plate 22 provided with a number of spaced notches in its periphery. That indexing plate is adapted to be engaged by a pawl actuated by the pivoted lever 23.

The housing 12 is adapted to accommodate either one of the sub-frames for a circular saw or a drag saw.

The sub-frame for a circular saw consists of a longitudinally disposed tube 24 having at its forward end a gear housing 25 with a transversely extending tubular member 26. Rotatably mounted in ball bearings fitted within the tube 24 is a driving shaft 27 having at its forward end a bevel gear wheel arranged so as to mesh with a second bevel gear wheel on a transverse shaft journaled in suitable bearings in the gear housing. The transverse shaft has a circular saw blade 28 fastened to its outer end in conventional manner.

The rear end of the driving shaft 27 is formed with a collar 29 having a pair of diametrally opposed pins 30 fitted through it. These pins 30 are adapted to engage in appropriate recesses formed in the relative surface of a driven V belt pulley wheel 31 which is mounted upon the rear end portion of the shaft 27. The pulley wheel 31 is secured in correct position on that shaft by means of a nut 32 screwed upon a neck 33 formed at the rear end of the said shaft. Thus, the drive to the shaft will be from the pulley wheel 31 through the pins 30 and collar 29. It will be apparent that the pulley wheel 31 may be readily detached from the shaft 27 by removing the nut 32 from the screw-threaded neck 33 and then pulling the pulley 31 from the end of the shaft 27.

A pair of clamping brackets 34 is fitted about the rear end of the longitudinal tube 24 so as to be firmly—but detachably—mounted thereon. The indexing lever 23 is pivotally mounted upon a bolt 35 fitted through the said brackets 34 and said lever 23 is provided with a forwardly extending pawl or finger 36 adapted to engage in a selected notch in the plate 22. When the pawl 36 is engaged in a notch in the plate 22 the longitudinal tubular member 24 will be held against rotation relative to the housing 12. The tube 24 may be readily turned in the housing 12 by pulling the lever 23 rearwardly so as to disengage its pawl 36 from the notch in the plate 22, then turning the lever 23 to a new selected position and permitting the pawl 36 to be engaged in an appropriate notch in said plate 22. A spring (not shown) is mounted so as to act upon the lever 23 and cause the pawl 36 to engage the indexing plate. The clamping brackets 34, and the lever 23 pivotally mounted between them, may be conveniently removed from the rear end of the tube 24 simply by slackening the screws which hold it in position and then sliding the brackets 34 off the end of said tube 24. It is to be noted that the diameter of the collar 29 is not greater than the diameter of the tube 24 at its rear end.

The forward end of the housing 12 is slotted at 37 and a pair of lugs 38 is provided on opposite sides of that slot. A clamping screw 39 is threadedly engaged in one of said lugs in such manner that, by turning the screw 39 in one direction, the forward end of the housing 12 may be clamped about the tube 24 and, by turning the screw in the opposite direction, that clamping pressure may be released. This form of clamp is provided to permit of angular adjustment of the circular saw to a finer extent than is provided by engagement of the finger 36 in the notches in the plate 22. The use of the indexing lever 23 and the index plate 22 will permit the saw sub-frame to be turned through 180°. But if a larger movement be required it is necessary merely to loosen the clamping brackets 34 and turn the sub-frame a desired amount, the brackets 34 being then tightened.

Two stops 40 are fitted to the outer side of the longitudinal tube 24 so as to limit the inward sliding movement of the tube 24 relative to the housing 12 when the circular saw sub-frame is being fitted to the main frame of the machine, and the stops 40 are at such a position that the rear end portion of the tube 24 and the shaft 27 will project the correct distances rearwardly of the rear end portion of the housing 12 when the stops 40 engage with the forward end of the said housing 12.

As a result of this construction of the saw sub-frame, it will be apparent that the longitudinal tube 24 may be readily detached from the housing 12 merely by removing the nut 32 from the screw-threaded neck 33, removing the pulley wheel 31 from the shaft 27, then removing the clamping brackets 34 from the tube 24, and finally sliding the whole of the circular saw sub-frame forwardly so as to disengage it from the housing 12. When it is desired to replace the sub-frame the tube 24 is slid into the housing 12 until the stops 40 contact the outer end of said housing 12, and then replace the brackets 34 and pulley wheel 31.

The sub-frame for the drag saw comprises a housing 41 so made that its rear portion is adapted to fit neatly within the housing 12 of the main frame. A collar 42 is provided on the housing at such a location between the ends thereof that the rear end portion of said housing will project a desired short distance beyond the rear end of the housing 12, and thereby accurately locate the housing 41 within the main frame housing 12. Near the forward end of the housing 41 there is a transverse pivot bolt 43 on which the rear end of a beam 44 is pivotally mounted. Between the pivot bolt 43 and the collar 42 there is a gear box 45 having mounted transversely through it a driven shaft 46. Fitted on that shaft 46, within the gear box 45, is a worm wheel which is in engagement with a worm upon the forward end of the driving shaft 47 of the drag saw sub-frame. At the outer end of the driven shaft 46 is a crank or pitman 48 operatively connected to the drag saw blade 49. The parts are so arranged that when the driving shaft 47 is driven rotationally within the housing 41, the worm upon its forward end will drive the worm wheel upon the driven shaft 46 so as to cause the pitman 48 to rotate and thereby move the drag saw blade 49 with a reciprocatory action.

The rear end of the driving shaft 47 is provided with a collar 29 having pins 30 fitted to it in the same manner as heretofore described; and the pulley wheel 31 is adapted to be engaged on the rear end portion of said shaft 47 so as to transmit rotational motion to it. The clamping brackets 34 with the lever 23 pivotally mounted between them are also adapted to be securely attached to the rear end portion of the housing 41 when said housing 41 is fitted correctly into position within the main frame housing 12.

At the front of the housing 41 there are a pair of holes 50, said holes being equidistant from the axis of the pivot bolt 43. A screw or bolt is fitted through the forwardly extending beam 44 so as to be adapted to engage in either of the holes 50, so that the angular position of the beam 44 relative to the housing 41 may be adjusted. In order to provide for an increased range of adjustment, a plate 51 is fastened to the beam 44 and said plate has formed in it a series of arcuately spaced holes 52 and the screw or bolt may be fitted through any aligned pair of holes 50—52 so as to hold the beam 44 in selected adjusted position.

Also mounted on the pivot bolt 43 is a forwardly extending arm 53 and said arm has at its front end a jaw member 54 adapted to press upon the top or unserrated edge of the drag saw blade 49. A housing 56 is provided with an adjusting lever 57. The housing 56 has a ratchet 55 incorporated with it, the ratchet being adapted to be engaged by a pawl 58 mounted pivotally on the housing 41.

When it is required for the arm 53 to exert a greater or lesser pressure upon the drag saw blade 49, the adjusting lever 57 is moved so as to turn the circular housing 56. It is apparent that when it is required to decrease the pressure, it will be necessary to release the pawl 58 prior to turning the circular housing 56. By this means the pressure to be applied to the drag saw blade 49 may be readily varied at will to suit any particular requirements.

At the forward end of the beam 44 there is fastened a spike 59, as is customary, and there is also provided a handle 60. A saw guide 61 is mounted on an arm 62 so as to be adapted to be moved into or out of engagement with the saw blade 49. Near the other end of the beam 44 there is fastened a bolt 63 and on that bolt is rotatably mounted a chain cam 64 having a lever arm 65 connected to it. A tension spring 66 is connected at one end to the lever 65 and at the opposite end to the beam 44 and acts in such manner as to draw the lever 65 rearwardly. A chain 67 is adapted to be connected to the beam 44 in conventional manner and when it is desired to apply a desired tension to that chain in order to hold the drag saw sub-frame firmly in engagement with a log which is being sawn, the chain is looped about the chain cam 64 after having pulled the lever 65 forwardly and then the lever 65 is released and the spring 66 will then apply suitable tension to the chain 67.

The sub-frame for the circular saw and the sub-frame for the drag saw are adapted to be readily interchangeable. In order to substitute the drag saw sub-frame for the circular saw sub-frame, the pulley wheel 31 and clamping brackets 34 are detached from the circular saw sub-frame, which is then removed from the housing 12, and the drag saw sub-frame is then fitted so that the appropriate end of the housing 41 engages in the main housing 12. The clamping brackets 34 are then fitted about the inner end portion of the housing 41 and the pulley wheel 31 is fitted in position on the inner or rear end of the shaft 47. The drag saw sub-frame will then be correctly located and mounted relative to the main frame of the machine and it may be put into use in normal manner. Owing to the ease in which the pulley 31 and clamping brackets 34 may be removed from the one sub-frame and replaced upon the other, the circular saw sub-frame and the drag saw sub-frame may be interchanged in a very short period of time and in a very convenient manner.

There is also provided a saw bench mounting of the construction illustrated particularly in Figure 6. This saw bench has a supporting frame 68 made of tubular metal and a movable frame member 69 is pivotally connected to the supporting frame 68 at 70. The movable frame is also made of tubular metal so as to provide for lightness of construction without detracting from the desired rigidity and it has a pair of upwardly extending members 71 which are adapted to fit on opposite sides of the circular saw blade 28 when the circular saw is mounted relative to the saw bench. At the upper end of the frame 68 there is securely mounted a V-shaped clamping member 72 and bolts 73 are fitted on opposite sides of that clamping member. An upper clamping plate 74 having a similar clamping member 72 secured to it is adapted to be engaged by the bolts and to be clamped downwardly by nuts fastened on the upper end of said bolts. The clamping members 72 are so made that they are adapted to grip the head portion 25, 26 of the circular saw sub-frame. By tightening the nuts on the bolts 73 to desired extent that head portion 25, 26 may be tightly clamped relative to the stationary frame 68 of the saw bench so that the saw bench and mobile circular saw will then constitute a unit, the arms 71 providing the guards for the saw blade 28. A chain 75 is provided to limit the upward swinging movement of the movable frame 69 relative to the stationary frame 68. When it is desired to use the saw bench, the frame 69 is moved upwardly, a log of wood is placed upon its platform and the frame 69 is moved rearwardly so that the log of wood is cut by the saw blade 28.

In moving the mobile circular saw from place to place the saw bench 68, 69 may be clamped to the head 25, 26 of the circular saw sub-frame so that the saw bench will be carried with the circular saw.

By reason of the particular construction, the one main frame may be employed for a variety of different purposes. If it is desired to fell a tree of relatively large diameter, the drag saw sub-frame may be fitted to the main frame and the drag saw employed for that purpose. The drag saw may also be used for cutting the felled tree into suitable lengths to be towed away. Then in order to trim the branches from the trunk of a tree, the drag saw sub-frame may be removed from the main frame and the circular saw sub-frame substituted. This is done for the reason that the circular saw will cut far more quickly than the drag saw and will be very effective in trimming the branches from the trunk. The circular saw may then be clamped in position upon the saw bench frame 68 and the smaller portions of the tree may then be cut into desired lengths by use of this saw bench.

The particular construction of drag saw sub-frame according to this invention will be found to be very efficient in use for the means for applying pressure to the arm 53 will be found to be very convenient to operate and also to be very efficient as the pressure upon the saw blade 49 may be varied according to particular requirements. By means of these spring loading devices, the spring pressure upon the saw blade 49 may be maintained substantially constant throughout the operation of cutting through a relatively large tree. Moreover, the means for applying tension to the chain 67 will be found to be very useful and to hold the beam 44 firmly in position during the entire cutting operation. As the beam 44 may be moved pivotally relative to the housing 41, the main frame of the machine may be maintained in a horizontal or near horizontal position even when the saw blade 49 is required to cut at an extreme angle. This will tend to increase the efficiency of operation of the power unit.

The design of the main frame and of the other parts of the machine is such that the machine as a whole will be relatively light even though it is of extremely sturdy construction. Consequently, it may be readily manoeuvred into desired position.

According to a further feature of the invention a member may be attached to the circular saw head of the mobile power saw (as an alternative or additional mounting) carrying power transmission devices adapted to be driven from the power unit of the mobile saw, the power transmission devices having means whereby a suitable auger may be connected thereto so as to constitute a post hole digger, or a rock borer, or the like.

The mobile power saw illustrated in Figures 7 to 10, denoted generally by the reference numeral 101, is provided with such a post hole digger attachment. Those parts of the mobile power saw which are identical with corresponding parts of the saw described above with reference to Figures 1 to 5 have been given the same reference numerals. Thus, in the mobile power saw illustrated in Figures 7 to 10, a forwardly-extending tubular housing 12 is provided in which is mounted a tube 24 carrying at its outer end a head portion 103 corresponding to the members 25, 26 previously described. A drive shaft corresponding to the shaft 27 described above is journalled in the tube 24 and drives, through suitable gearing, a transverse shaft here designated 104 journalled in the head portion 103. When the mobile power saw 101 is used in conjunction with a circular saw blade that blade is, as previously described, mounted on the shaft 104 and it is from said shaft 104 that the drives are taken for the post hole digger attachment about to be described.

A mounting member 105 is adapted to fit on to the head portion 103, and a clamp plate 106 is associated with the mounting member 105. Both the members 105 and the clamp plate 106 are provided with rubber-faced seatings 107—see Figure 9—and as shown in Figure 10 they are bolted together so as to fit tightly about part of the head portion 103. The mounting member 105 has a bracket 108 the outer end of which registers with a flange 109 on the head portion 103 when the member 105 is correctly positioned, and desired rigidity of mounting is ensured by bolting the bracket 108 to the flange 109. In order to ensure correct location of the member 105 on the head portion 103 a finger piece 110 is provided at one end of said mounting member 105, the mounting member 105 being correctly located when the finger piece 110 is in contact with the end of the head portion 103.

A handle 111 is bolted to the mounting member 105, said handle extending forwardly and being of such length that adequate purchase may be obtained to apply a working downward pressure upon the earth auger.

A transverse countershaft 112 is freely journalled in bearings mounted in the member 105, and a chain sprocket wheel 113 is fastened at one end of said shaft 112 by means of a nut 114. A chain guard 115 is fastened to the mounting member 105 so as to fit partly about the sprocket 113. At the opposite end of the shaft 112 there is a bevel pinion gear wheel 116. The bearing at that latter end of the shaft 112 is held in position by a bearing cap 117.

A boring head is mounted so that it may be turned upon the bearing cap 117 and, therefore, moved pivotally relative to the mounting member 105. This boring head comprises a housing member 118, a cover 119 fastened to the housing, and a clamp ring 120 secured to the housing 118, the clamp ring 120 fitting about the bearing cap 117 so that the boring head is rotatably movable relative to the bearing cap 117 but is not detachable therefrom unless the clamp ring 120 is disconnected from the housing 118.

A bracket 121 is fastened to the clamp ring 120, and a plate 122 is fastened to the mounting member 105, the plate 122 fitting about the transverse shaft 105. Pivotally mounted on the plate 122 is a locking lever 123 adapted to engage in any selected slot 124 of a series of slots formed in the bracket 121. The locking lever 123 is spring loaded so that it will normally be held engaged in a slot 124 of the bracket 121, but when the outer end of the lever 123 is depressed its opposite end will be disengaged from the slot 124. This locking lever 123 is, therefore, adapted to hold the boring head in a selected position relative to the member 105.

A drive shaft 125 has its upper or inner end journalled in a thrust race 126 carried by the cover 119 and its opposite end portion extends outwardly of the boring head housing 118. A bevel gear wheel 127 is fastened to the inner end portion of the drive shaft 125 so that the gear wheel 127 is in mesh with and adapted to be driven by the bevel pinion 116. A suitable seal 128 is provided to reduce leakages of lubricant at the outer end portion of the drive shaft 125 and, at that end of the shaft 125, a coupling sleeve 129 is fastened to the shaft means of a pin 130. This sleeve is internally screw-threaded and is adapted to engage screw-threadedly with the screw-threaded end of an earth boring auger 131 or, alternatively, a rock auger.

Two handles 132 are bolted to the housing 118, on opposite sides thereof, so as to enable an operator to control the angularity of the boring head relative to the surface of the earth.

A driving chain sprocket 133 is mounted upon the shaft 104 of the mobile power unit, being locked in position by a lock nut 134, and a chain 135 is engaged with the two sprockets 113 and 133 so that when the shaft 104 is driven a drive will be transmitted from the sprocket 133, through the chain 135 to the sprocket 113 and thence through the countershaft 112, pinion 116, gear 127, drive shaft 125, pin 130, and coupling sleeve 129 to the auger 131.

The housing member 118 is supported relative to the mounting member 105 in such manner that the housing 118 may be turned relative to the mounting member without affecting the drive from the pinion 116 to the crown gear wheel 127 and drive shaft 125. The lever 123, when engaged in a slot 124 in the bracket 121, will hold the housing 118 against any such turning movement but when that locking lever is disengaged the housing 118 may turn freely.

In order to fit the attachment to the mobile power saw the circular saw blade is removed from the shaft 104 and the head portion 103 turned to the position indicated in Figure 8. The mounting member 105 is then fitted to the head portion 103 and clamped in position, and the chain sprocket 133 is mounted on the shaft 104. The chain 135 is then fitted to the sprockets 113 and 133 so that there is provided the drive from the mobile power unit to the post hole digger attachment.

When the attachment is to be transported the housing 118 is swung relative to the tube 24 until the auger 131 is substantially parallel to that tube and towards the rear of the power unit. The housing 118 is held in that position by the locking lever 123. When it is desired to use the attachment the locking lever 123 is disengaged and the housing 118 swung downwardly until the apparatus is substantially in the position shown in Figure 7. Owing to the pivotal connection of the housing 118 to the mounting member 105 the auger 131 may be held in substantially vertical position during its operation even though the power unit will be moved pivotally as the auger is driven into the earth. Moreover, on uneven or sloping ground the auger may be used to drill vertical holes in the ground. Alternatively, holes may be formed at any desired angle to the vertical—even horizontal. For the drilling of horizontal holes—as in rock drilling—the tube 24 is turned until the auger 131 (or rock drill, if such be used) is held horizontally and the tube 24 is fastened in the desired position. An arrangement permitting such adjustment of the angularity of the tube 24 has been described with reference to Figures 1 to 5.

In constructing a post hole digger attachment for some designs of mobile power saw it may not be necessary to provide the countershaft 112—the drive being taken directly from the shaft 104 and the attachment being mounted for pivotal movement about the axis of the shaft 104. Furthermore, the drive to the shaft 125 may be through a worm gear—which will permit of angular adjustment of the drive shaft 125 relative to the tube 24 in somewhat the same manner as the pinion and crown wheel device illustrated in Figures 7 to 10.

A mobile power saw in accordance with my invention may have at least one wheel mounting fitted to a supporting leg or other portion of the frame of the mobile circular saw, and fitted to that wheel mounting a transport wheel, the wheel mounting being of such nature that the frame of the saw may be raised so that the saw blade may be conveniently located on about the longitudinal center line of a log to be sawn without the wheel and/or supporting leg fouling the side of the log. The wheel mounting preferably consists of a bracket adapted for fitment to the axle at the lower end of one leg of the saw frame and having an extension member which is provided at its lower end with a stub axle whereon the transport wheel may be readily fitted, the bracket acting to raise the frame of the saw at one side by an amount equivalent to the height of the extension member. The wheel mounting may be made as an attachment to be fitted to the saw frame only when the frame is to be raised.

The wheel mounting shown in Figures 11 to 14 has a tubular extension member 205 at the lower end of which is fastened a plate 206. Secured to the under side of the plate 206, as by welding, is a transverse axle member 207—also made of tubular material—having a spacing plate or collar 208 fastened to it outwardly of the extension member 205, and near the outer end of the axle member 207 holes 209 are formed through the wall of the tubular axle. The axle member 207 is of such diameter that a transport wheel 210 of the power circular saw may be conveniently and correctly fitted on it, a pin 211 being then fitted into the holes 209 so as to retain the wheel 210 in position. The wheel 210 is then located between the spacing plate or collar 208 and the pin 211, and if desired a suitable washer may be fitted on the axle member 207 between the pin 211 and the outside of the wheel 210.

At the upper end of the extension member 205 a tubular head member 212 is fastened, as by welding. Secured co-axially within the head member 212 is a bolt 213 which is substantially longer than the head member 212. A nut 214 is engaged on the screw-threaded end of the bolt 213. Fastened to the head member 212 are two upwardly-extending side plates 215 each having an inward extension 216 at its upper end. A bolt hole 217 is provided in each of the extensions 216 so that a bolt 218 may be fitted through the side plate extensions to assist in fastening the wheel mounting in position.

In order to fit the wheel mounting in position at the lower end of a supporting leg of a mobile power circular saw the transport wheel 210 is detached from the stub axle 219 at the lower end of the supporting leg 220. The wheel mounting is then fitted in position so that the bolt 213 fits through the stub axle 219 and the tubular head member 212 fits about the outer end portion of the stub axle. The head member is made so that its internal diameter is a small amount larger than the external diameter of the stub axle and the bolt 213 is somewhat longer than the stub axle 219 so that the screw-threaded end of the bolt 213 will project beyond the inner end of the axle 219 when the tubular head member 212 is pushed on to the axle 219 as far as it will go—with the inner end of the head member 212 in contact with a collar 221 on the stub axle 219. The nut 214 is then engaged on the bolt 213 and tightened so that the head member 212 is fastened on said stub axle 219.

In fitting the wheel mounting in position on the stub axle the wheel mounting is located so that the side plates 215 are disposed with the inward extensions 216 thereof on opposite sides of the supporting leg 220. The bolt 218 is then fitted through the holes 217 in said extensions 216 and a nut is screwed tightly on to the bolt 218 so that the side plates will be drawn together, thereby causing the inward extensions 216 to grip the supporting leg 220 tightly. Then, the extension member 205 will be held in substantially the same plane as the supporting leg 220.

The transport wheel 210 is then mounted on the axle member 207 and the pin 211 is engaged in the holes 209 so as to hold it in position.

The wheel mounting is so designed and constructed that when it is fitted in position as shown in Figures 11 and 12, and the transport wheel 210 is mounted upon the axle member 207, then the extension member 205 will be supported substantially vertically in a transverse plane—see Figure 12.

By fitting the wheel mounting upon the stub axle 219 and mounting the wheel 210 upon the axle member 207 the one side of the circular saw frame is raised by an amount equivalent to about the length of the extension member 205, and the circular saw unit is therefore tilted to one side. The angle of tilt of the circular saw frame is such that the circular saw blade carried by the frame may be readily adjusted in angularity an equivalent amount to compensate for the tilt of the frame so that the circular saw blade will be held in substantially vertical position. For the purpose of ripping a log of relatively large diameter the wheel mounting is set in position so that the saw frame is tilted and one side of the saw frame raised. The circular saw unit is then moved to appropriate position relative to the log to be ripped, with the supporting legs of the saw unit straddling the log, and the circular saw blade is adjusted in angularity so that it is in substantially vertical position. The saw is set in operation and it is moved into engagement with the log so that it is cutting along about the longitudinal centre line of the log, as shown in Figures 11 and 12. The requisite sawing operations are completed so that the log is cut into two halves.

If desired a wheel mounting may be fitted on each side of the saw frame so that, when the wheel mountings are so fitted, the whole saw frame will be raised. The saw frame will not, then, be tilted.

According to a further feature of my invention the main frame which carries the saw blade frame is pivotally mounted relative to the legs which support the transport wheels and a preferred form of such a mobile power saw is shown in Figures 15 to 22 to which reference is now made.

The saw-carrying frame of the circular saw unit includes the longitudinal housing 24 which is mounted in the tubular member or housing 12 fastened at the front of the engine mounting frame 313. To the underside of the tubular member 12 is fastened a tubular support 314 having a plate 315 secured to its lower end. A boss member 316 is fastened to the underside of the plate 315 by means of bolts 317 and a stop member 318 is secured to the front portion of the plate 315. Bracing bars 319 are secured to, and extend backwardly from, the front portion of the tubular member 312 back to the plate 315—to which they are secured as by welding—and then back to the rear of the engine mounting frame 313 to which they are secured, said bars 319 providing a support for the head member constituted by the tubular support 314, plate 315 and boss member 316.

At the rear of the tubular support 314 a bracket 320 is fastened, and a detent 321 is pivotally connected to said bracket. A tension spring 322, housed within the tubular support 314, is connected at one end to the detent 321 and it is anchored to a pin 323 at its opposite end, suitable openings 324 and 325 being provided in the tubular support 314 to enable the ends of the spring to fit through the support. The lower end of the detent 321 is engageable in a slot or notch 326 provided in the rear portion of the plate 315.

Mounted beneath the plate 315 is a lower plate 327 to which is secured a tubular hub member 328, the supporting legs 329 of the circular saw unit being securely fastened to the hub member 329. The lower plate 327 has a central opening and the upper portion of the boss 316 fits neatly into that opening so that the boss can turn pivotally relative to the lower plate 327. The lower portion of the boss member 316 is of greater diameter than the central opening in the lower plate so that when the lower plate 327 is located beneath, and in contact with, the underside of the plate 315 and the boss member 316 is fastened in position by means of the bolts 317 then the lower plate 327 will be held firmly, but rotatably, in position beneath the plate 315. The hub member 328 is somewhat larger in diameter than the lower portion of the boss 316, as is shown in Figure 17.

Two stop members 330 are secured to the front portion of the lower plate 327, being so located that they will limit the movement of the stop member 318 on the plate 315 and thereby limit the rotary movement of the plate 315 relative to the lower plate 327—see Figures 19 and 20. In the rear portion of the lower plate 327 there is a notch 331 which is in registration with the slot or notch 326 in the plate 315 when the saw-carrying frame is in its intermediate or mid-position relative to the legs 329—the normal position for transport purposes. When the two notches 326 and 331 are in registration the detent 321 may be engaged in them so as to hold the two plates 315 and 327 in fixed position the one relative to the other. When the detent 321 is disengaged from the two notches the plate 315 may be turned relative to the lower plate 327 about their common central axis.

The supporting legs 329 of the saw unit are set at an angle to the vertical—they extend forwardly of the tubular hub member 328. In the construction of the circular saw unit illustrated in Figures 15 to 20 the legs 329 are shown as extending laterally outwards and downwardly from the hub member 328. The construction of saw units having the supporting legs extending laterally outwards and downwards is well known but the present invention provides for the mounting of the supporting legs 329 so that, in addition, they extend downwardly and forwardly—away from the frame 313.

In order to actuate the detent 321 and effect its release from engagement in the notches 326 and 331 I provide a rod 332 connected at its front end to the detent 321 and at its rear end to a hand lever 333 pivoted at 334 on a bracket 335 fastened to the rear of the frame 313. A slot 336 is provided in the rear member of the frame 313 so as to permit the rod 332 to pass through said rear member, and the lower extremity of the slot 336 constitutes a stop to limit the pivotal movement of the hand lever 335—when the rod 332 makes contact with the lower end of the slot 336 the hand lever 333 cannot be pulled any further downwardly.

The slot 336 is of such length that when the hand lever 333 has been pulled down and back as far as possible then the rod 332 will be a short distance beyond the centre line of the pivot 334, that is to say, beyond the "dead centre" position (see Figure 17).

In the modified construction of detent-release mechanism illustrated in Figures 21 and 22 the rear end of the rod 332 is connected to one end of a lever 337 which is pivotally mounted at 338 on a bracket 339 fastened to the rear member of the frame 313, the opposite end of the lever 337 being formed as a pedal 340. Slidably mounted in the bracket 339 is a catch member 341 which is so arranged that it rests upon the lever 337 when that lever is in the "engaged" position as shown in Figure 21; but when the pedal 340 of the lever 337 is pushed forwardly so as to draw the rod 332 rearwardly and disengage the detent 321 from the notches 326 and 331 then the catch member 341 will slide downwardly so as to engage behind the pedal 340—see Figure 22—and thereby prevent the lever 337 returning to its "engaged" position. The catch member 341 must be raised in order to release the lever 337 and permit the rod 332 to move forwardly.

It will be apparent that when the detent 321 is engaged in the notches 326 and 331 the plate 315 will be held in fixed position relative to the lower plate 327 and that the longitudinal housing 24 will then be held in fixed relationship with the transport wheels of the saw unit. When the detent 321 is disengaged from the two notches 326 and 331 then the housing 24 may be swung sideways relative to the transport wheels, as is shown in Figure 16. If it be desired to lock the housing 24 in the mid-position relative to the transport wheels it is merely necessary to actuate the catch devices so that the rod 332 will be free to move forwardly and then swing the saw-carrying frame until the detent 321 is engaged in both notches 326 and 331.

In the operation of the mobile saw unit the unit is wheeled into desired position in customary manner. Then, in order to swing the saw blade pivotally sideways relative to the transport wheels of the unit the lever 333 (or 337, in the modified arrangement illustrated in Figures 21 and 22) is actuated so as to release the detent 321 from its engagement in the notches 326 and 331, thereby permitting the frame of the saw unit to be swung in a pivotal manner relative to the transport wheels without any tilting action caused by any unevenness in the ground. If it be found necessary to pull the saw unit rearwardly without re-engaging the detent 321 in the notches 326 and 331 it will be found that the transport wheels, by reason of their forward setting relative to the hub member 328, will follow correctly so that the saw unit will not swing out of control.

It will be realized that there may be incorporated any other means for effecting engagement between the detent and the rotatable plate—such as hand control levers connected to the detent by flexible power transmission cable. Similarly, any other construction of the detent may be incorporated and the wheels of the unit may be mounted rotatably relative to the frame in any other suitable manner.

I claim:

1. A mobile power unit comprising a main frame, a power source on the frame, a pair of legs at either side of the frame, a wheel axle on each leg remote from the frame, a pair of transport wheels adapted to be detachably mounted on the wheel axles and either wheel upon a wheel mounting, said wheel mounting comprising a tubular head receiving the wheel axle on one leg and detachably secured thereto, attachment members rigid with the head and detachably secured to said one leg intermediate the wheel axle thereon and the frame, and a wheel axle spaced below and coplanar with the axle on said one leg, one transport wheel being mounted on the wheel axle of the wheel mounting and the other wheel being mounted on the wheel axle on said other leg.

2. A mobile power unit as claimed in claim 1, wherein the attachment members comprise a pair of arms extending in the same general direction from the head and embracing said one leg, and means securing together the extremities of said arms whereby to clamp them about the leg.

3. A mobile power unit for a circular saw, comprising a main frame, a pair of transport wheels supporting said frame at either side thereof, means for manually guiding the frame, means to support a circular saw for rotation at a position remote from the frame and in a substantially vertical plane and means to transmit drive from the power source to the circular saw when so supported, whereby to enable ripping of a log by manual movement of the power unit with the frame positioned to straddle the log, a pair of legs at either side of the frame, a wheel axle on each leg remote from the frame, said pair of transport wheels being adapted to be detachably mounted on the wheel axles and either wheel upon a wheel mounting, said wheel mounting comprising a tubular head receiving the wheel axle on one leg and detachably secured thereto, attachment members rigid with the head and detachably secured to said one leg intermediate the wheel axle thereon and the frame, and a wheel axle spaced below and coplanar with the axle on said one leg, one transport wheel being mounted on the wheel axle of the wheel mounting and the other wheel being mounted on the wheel axle on said other leg, whereby to support said frame with greater ground clearance than when said transport wheels are mounted on the wheel axles on said legs.

4. A mobile unit for a circular saw, comprising a main frame, means on the frame for manually guiding the unit, a power source on the frame, means driven by the power source to carry a circular saw, said saw-carrying means being adjustable for rotation of the saw in either a vertical or horizontal plane, a subsidiary frame carrying the main frame, said frames being pivotally connected about a vertical pivot axis, a pair of legs at either side of the subsidiary frame, a transport wheel on each leg, said wheels and legs being disposed to provide clearance under said frames for straddling a log to be ripped by a saw on said saw-carrying means cutting in the vertical plane, said pivot axis being located intermediate the guiding means and the saw-carrying means and further from the saw-carrying means than are the axes of said wheels whereby, with the wheels locked and a saw on said saw-carrying means rotating in the horizontal plane, the saw can be swung to cut standing timber, and, when the wheels are unlocked and the saw is withdrawn, the wheels will correctly follow the guiding means.

5. A wheel mounting comprising a pillar, a wheel axle projecting to one side of said pillar at the lower end thereof, a tubular head at the upper end of the pillar which head is constructed to receive and be secured to a wheel axle similar to that at the lower end of the pillar, a pair of arms rigid with the head and extending therefrom in the same general direction upwardly from and to one side of the pillar whereby to embrace a part carrying said similar wheel axle when said axle is received by the head, and means to secure together the extremities of the arms in clamping relation about said part.

(References on following page)

References Cited in the file of this patent

UNITED STATES PATENTS

| | | |
|---|---|---|
| 757,770 | Richter | Apr. 19, 1904 |
| 910,145 | O'Hara | Jan. 19, 1909 |
| 1,609,651 | McMillan | Dec. 7, 1926 |
| 1,622,704 | Coil | Mar. 29, 1927 |
| 2,174,415 | Curtis | Sept. 26, 1939 |
| 2,407,028 | McLean | Sept. 9, 1946 |
| 2,410,508 | Lamme | Nov. 5, 1946 |
| 2,412,704 | Jaques | Dec. 17, 1946 |
| 2,420,836 | Nelson | May 20, 1947 |
| 2,461,188 | Stoner | Feb. 8, 1949 |
| 2,526,131 | Harnish et al. | Oct. 17, 1950 |
| 2,548,411 | Vache | Apr. 10, 1951 |
| 2,577,448 | Carr | Dec. 4, 1951 |
| 2,578,097 | Soss | Dec. 11, 1951 |
| 2,580,110 | Mabry | Dec. 25, 1951 |
| 2,580,721 | Beccard | Jan. 1, 1952 |
| 2,621,055 | O'Kelley | Dec. 9, 1952 |
| 2,621,686 | Tompkins | Dec. 16, 1952 |
| 2,675,032 | Brown | Apr. 13, 1954 |
| 2,687,309 | Anders | Aug. 24, 1954 |

FOREIGN PATENTS

| | | |
|---|---|---|
| 139,339 | Australia | Nov. 9, 1950 |
| 142,258 | Australia | July 16, 1951 |